United States Patent [19]

Denzinger et al.

[11] 4,250,289
[45] Feb. 10, 1981

[54] PREPARATION OF COPOLYMERS FROM MALEIC ANHYDRIDE AND ALKENES

[75] Inventors: Walter Denzinger, Speyer; Claus Cordes, Weisenheim, both of Fed. Rep. of Germany

[73] Assignee: BASF Aktiengesellschaft, Fed. Rep. of Germany

[21] Appl. No.: 74,067

[22] Filed: Sep. 10, 1979

[30] Foreign Application Priority Data

Sep. 18, 1978 [DE] Fed. Rep. of Germany ....... 2840501

[51] Int. Cl.$^3$ ....................... C08F 2/20; C08F 222/06
[52] U.S. Cl. ................................ 526/201; 526/209; 526/272; 526/910
[58] Field of Search ................ 526/272, 201, 209, 910

[56] References Cited

U.S. PATENT DOCUMENTS

| | | | |
|---|---|---|---|
| Re. 28,475 | 7/1975 | Blecke et al. | 526/272 |
| 2,378,629 | 6/1945 | Hanford | 526/272 |
| 2,430,313 | 11/1947 | Vana | 526/272 |
| 3,532,771 | 10/1970 | Field et al. | 526/209 |
| 4,048,422 | 9/1977 | Sackmann et al. | 526/272 |

OTHER PUBLICATIONS

Die Angewandte Makromolekulare Chemie 69, 1978, pp. 141-156.

*Primary Examiner*—John Kight, III
*Attorney, Agent, or Firm*—Keil & Witherspoon

[57] ABSTRACT

A process for the preparation of copolymers of maleic anhydride and relatively long-chain alkenes by suspension polymerization of these monomers in the presence of a free radical initiator and a dispersant at an elevated temperature, in excess alkene as the suspension medium, wherein a poly(alkyl vinyl ether) is used as the dispersant.

3 Claims, No Drawings

PREPARATION OF COPOLYMERS FROM MALEIC ANHYDRIDE AND ALKENES

The present invention relates to a simple process for the preparation of copolymers of maleic anhydride with alkenes of 6 to 10 carbon atoms by free radical-initiated suspension polymerization in the presence of a particular dispersant.

The preparation of copolymers of maleic anhydride with 1-alkenes (olefins) by mass polymerization, solution polymerization, precipitation polymerization or suspension polymerization, using free radical initiators, is known. For example, U.S. Pat. No. 2,378,629 discloses the preparation of copolymers of maleic anhydride with 1-alkenes, with or without using an excess of the latter, by mass polymerization or solution polymerization. Further, U.S. Pat. No. 2,430,313 discloses the preparation of copolymers of maleic anhydride and 1-alkenes by precipitation polymerization in an inert solvent. U.S. Pat. No. 3,729,451 discloses the suspension polymerization of 1-olefins of 4 to 14 carbon atoms with maleic anhydride in an excess of the 1-olefin employed, the dispersant used being a copolymer of maleic anhydride and 1-olefins of 14 to 18 carbon atoms. Finally, German Laid-Open Application DOS No. 2,501,123 discloses the preparation of copolymers of 1-olefins of 2 to 8 carbon atoms and maleic anhydride by suspension polymerization in excess 1-olefin, or in the 1-olefin and a solvent which is inert toward the monomers and dissolves the 1-olefin but not the maleic anhydride, in the presence of particular dispersants, eg. the monoesters or monoamides of the copolymers with higher alcohols or higher amines respectively.

The above processes suffer from certain disadvantages. If the process of U.S. Pat. No. 2,430,313 is carried out as a precipitation polymerization, the polymers are obtained in sizable lumps. According to U.S. Pat. No. 3,729,451, this disadvantage of lump formation is obviated by carrying out the polymerization in the presence of a copolymer of maleic anhydride and 1-olefins of 14 to 18 carbon atoms. The reaction products are obtained in the form of irregularly shaped particles of from about 20 to 500 $\mu$m diameter, which for many of their uses nevertheless still require milling. It is true that using the method of German Laid-Open Application DOS 2,501,123 the polymers are obtained in the form of spherical particles having a narrow size distribution ranging from 10 to 30 $\mu$m. This particle size is acceptable for certain applications, but is still too coarse for neutralizing the powder with alkali and then converting it to an aqueous solution, and also generally too coarse for dissolving.

Angew. Makromol. Chem. 69 (1978), 141–156 discloses that very finely divided copolymers of maleic acid and diisobutylene, having a particle size of less than 5 $\mu$m, can be obtained by suspension copolymerization in excess diisobutylene if the dispersants disclosed in German Laid-Open Application DOS No. 2,501,123 are added to the polymerization batches in amounts of up to 20 percent by weight or even more (loc. cit., page 152, paragraph 3 and page 153, FIG. 3). If, however, 5 percent by weight or less of dispersant is added, the particle sizes obtained according to this publication show a broad distribution and may be from 1.5 to 50 $\mu$m.

The disadvantage of this method is that a substantial amount of dispersant is used and that the polymer particles obtained have a heterogeneous structure—they consist of maleic anhydride/diisobutylene copolymers with up to 20 percent by weight, or more, of dispersant.

It is an object of the present invention to provide a method of preparation of copolymers of maleic anhydride and alkenes of 6 to 10 carbon atoms, which have very uniform particle sizes, with diameters of less than 10 $\mu$m, and to provide dispersants for this process which are sufficiently effective in very small amounts.

We have found that this object is achieved, surprisingly, by a suspension polymerization in the presence of free radical initiators and of particular dispersants, as defined in the claims.

This process gives highly concentrated suspensions of copolymers which consist of spherical particles having a diameter of from 0.5 to 10 $\mu$m, preferably from 1 to 6 $\mu$m.

The polymers can be filtered off from the excess olefin in a simple manner and can then be dried in conventional contact dryers (eg. paddle dryers). The excess olefin can then be re-used.

The starting monomers for the process according to the invention are maleic anhydride and $C_6$-$C_{10}$-olefins. These may be 1-olefins or mixtures of 1- and 2-olefins, examples being hex-1-ene, oct-1-ene, dec-1-ene, mixtures of these with the corresponding 2-olefins, and especially technical-grade diisobutylene, which is a mixture of 2,4,4'-trimethylpent-1-ene and 2,4,4'-trimethylpent-2-ene.

In principle, maleic anhydride and the olefin or olefin mixture copolymerize in the equimolar ratio. For suspension polymerization, however, the alkene (referred to as such for convenience) is employed in such excess that after the polymerization the solids content of the suspension is from 20 to 75%, preferably from 35 to 60%, in each case based on the weight of the suspension.

The dispersant according to the invention—hereafter also referred to as the protective colloid—is employed in amounts of from 0.01 to 5%, preferably from 0.1 to 2%, based on the weight of the monomers. The dispersant is a polymer of an alkyl vinyl ether of 1 to 20 carbon atoms per alkyl chain. It should preferably have a K value of from 20 to 100, especially from 40 to 80, measured in 1% strength solution in cyclohexanone at 25° C.

Specific examples are the polymers of methyl, ethyl, n-butyl, tert.-butyl, dodecyl or octadecyl vinyl ether, amongst which those of ethyl, n-butyl, tert.-butyl and octadecyl vinyl ether are of particular interest.

The copolymerization follows the pattern of a conventional free radical-initiated suspension polymerization.

Suitable free radical initiators are conventional organic initiators, eg. dialkyl peroxides, alkyl hydroperoxides, peresters, diacyl peroxides, ketone peroxides and azo compounds. Specific examples are di-tert.-butyl peroxide, dicumyl peroxide, tert.-butyl hydroperoxide, cumene hydroperoxide, tert.-butyl perpivalate, tert.-butyl peroctoate, tert.-butyl perbenzoate, lauroyl peroxide, benzoyl peroxide, acetyl cyclohexanesulfonyl peroxide, isopropyl percarbonate, methyl ethyl ketone peroxide, acetylacetone peroxide, azodiisobutyronitrile, azodicarboxamide and azodicarboxylic acid methyl ester.

The appropriate amount of initiator is usually from 0.01 to 6%, preferably from 0.5 to 4%, based on the copolymer being formed from maleic anhydride and olefin in the molar ratio.

The polymerization can be carried out batchwise or continuously, at from 60° to 200° C., preferably from 80° to 150° C., and under pressures of from 1 to 40 bar, preferably from 1 to 20 bar.

The polymerization can also be carried out—without effect on the particle size—in the presence of conventional compounds which influence the molecular size, such as regulators, eg. dodecylmercaptan, thiophenol, butyraldehyde or cyclohexene, or chain extenders containing 2 or more polymerizable groups in the molecule, eg. butanediol divinyl ether, butanediol diacrylate, vinyl acrylate, divinylbenzene, divinyldioxane, pentaerythritol triallyl ether or polyallylsucrose. The amount of regulator or chain extender used may be from 0.01 to 5%, preferably from 0.1 to 2%, based on the copolymer being formed from maleic anhydride and olefin in the molar ratio.

Conventional stirred equipment may be used for carrying out the polymerization, stirred kettles with blade stirrers or impeller stirrers being particularly suitable. The rate of stirring should be selected to ensure that the olefin-insoluble maleic anhydride forms an extremely fine suspension in the olefin.

The above copolymerization measures give the desired product in one step if 1-alkenes are employed as starting monomers. If mixtures of 1-alkenes and 2-alkenes, such as diisobutylene are employed, it is advantageous, if the 2-alkene constituent is also to polymerize completely, to modify the process so that after the polymerization the residual unpolymerized alkene is fed to a fresh polymerization batch, with the portion consumed by the polymerization being replaced by fresh olefin mixture. This process must be repeated at least 3 times, preferably 7 times, so that the 2-olefin component shall also be completely incorporated into the polymer molecule. The polymers produced from the successive individual processes are then combined.

If, for example, technical-grade diisobutylene is copolymerized with maleic anhydride once only, copolymers which are of sufficiently fine particle size are, it is true, obtained, but these contain virtually only copolymerized, 2,4,4'-trimethylpent-1-ene units and the 2-olefin component is thereby lost.

The polymer suspensions formed are mobile or slightly viscous, depending on the solids content, and consist of spherical polymer particles with diameters of from 0.5 to 10 μm, mostly from 1 to 6 μm. An economical method of isolating the copolymers is, for example, spray-drying. However, the fine particles can also readily be filtered off and then be dried in conventional dryers, eg. paddle dryers. These polymer suspensions are particularly suitable for direct conversion of the copolymers into aqueous alkali metal salt solutions or ammonium salt solutions by hydrolysis. For this purpose, water is added to the polymer suspension, the excess olefin is distilled off by passing steam into the mixture, and the mixture is then neutralized with aqueous ammonia and/or alkali.

After the phases have separated out, the olefin which has distilled off can be separated from the water and be re-used directly for subsequent polymerizations, as a rule without purification. This is particularly important if mixtures of 1- and 2-olefins are employed (see above).

The copolymers are of substantially equimolar structure and have K values of from 12 to 100, preferably from 15 to 50; the K values are determined in 1% strength solution in cyclohexane at 25° C.

The copolymers obtained according to the invention can be used, in the form of anhydrides, as reactive components, for example in the surface-coating sector, or, in the form of their hydrolysis products (alkali metal salts and/or ammonium salts) as dispersants for white pigments, as paper sizes and as coating agents for paper, wood, leather and the like.

The Examples which follow illustrate the invention. Parts are by weight. The K values were determined by the method of H. Fikentscher, Cellulose-Chemie 13 (1932), 58–64 and 71–74.

EXAMPLE 1

400 parts of hex-1-ene and 0.6 part of an 80% strength solution, in gasoline, of a poly(n-butyl vinyl ether) having a K value of 50 were introduced into a 1 liter flask equipped with a blade stirrer, the batch was heated to the boil (about 65° C.) whilst being stirred at 200 rpm, and 98 parts of fused maleic anhydride and a solution of 2 parts of tert.-butyl perpivalate in 25 parts of hex-1-ene were added uniformly over 2 hours. The mixture was then refluxed for a further 2 hours. The thin suspension obtained consisted of spherical particles of sizes from 2 to 4 μm. The K value of the polymer was 31. The solid product was isolated by drying in a glass dish at 50° C. under reduced pressure.

EXAMPLE 2

150 parts of maleic anhydride, 355 parts of oct-1-ene, 0.5 part of n-dodecylmercaptan and 2.2 parts of a 70% strength solution, in toluene, of a poly(ethyl vinyl ether) having a K value of 50 were heated to the boil (about 120° C.) in a 1 liter flask equipped with a blade stirrer, whilst being stirred at 200 rpm, and a solution of 3.2 parts of tert.-butyl peroctoate in 30 parts of oct-1-ene was added uniformly over 4 hours. The mixture was then boiled for a further hour. The thin suspension obtained consisted of spherical particles of sizes from 2 to 5 μm. The K value of the polymer was 24. The solid product was isolated by drying on a rotary evaporator.

EXAMPLE 3

290 parts of diisobutylene (a mixture of 80% of 2,4,4'-trimethylpent-1-ene and 20% of 2,4,4'-trimethylpent-2-ene), 122.5 parts of maleic anhydride and 3.5 parts of a 70% strength solution of a poly(octadecyl vinyl ether) having a K value of 25 in diisobutylene were introduced into a 1 liter flask equipped with a blade stirrer, the mixture was then heated to the boil (about 102° C.), and 13 parts of an initiator solution of 25 parts of diisobutylene and 2.63 parts of tert.-butyl peroctoate were added over 4 hours, whilst running the stirrer at 200 rpm. The remainder of the initiator solution was then added and heating at the boil was continued for 1 hour. The mobile suspension obtained consisted of spherical particles of sizes from 1 to 3 μm. The solid product was isolated in an inert gas spray-dryer. The K value of the polymer was 34. The polymer contained almost exclusively 2,4,4'-trimethylpent-1-ene units.

EXAMPLE 4

600 parts of a diisobutylene mixture comprising 80 percent by weight of 2,4,4'-trimethylpent-1-ene and 20 percent by weight of 2,4,4'-trimethylpent-2-ene and 1.4 parts of a 70% strength solution of a poly(ethyl vinyl ether), having a K value of 50 in toluene, were introduced into a 2 liter glass autoclave equipped with an anchor stirrer, and the mixture was heated until it boiled gently (about 102° C.). 196 parts of maleic anhydride, as a liquid, and a solution of 8.4 parts of tert.-butyl peroctoate in 40 parts of diisobutylene were then run in uniformly over 3 hours and heating at 102° C. was thereafter continued for 1 hour. 600 parts of distilled water were then added to the suspension and the diisobutylene was distilled off, by introducing steam, until the temperature at which the vapor passed over reached 99° C. After the phases had settled out, the less dense diisobutylene was separated from the distillate and made up to 600 parts, with diisobutylene mixture of the above composition, for use in the next polymerization batch. A renewed polymerization then carried out gave a copolymer suspension of spherical particles with sizes of about 3–6 μm. The K value of the polymer was 26.5. According to $^{13}$C-NMR analysis, the copolymer contained 3 mole % of 2,4,4'-trimethylpent-2ene. On reusing the diisobutylene mixture 7 times, in accordance with the above instructions, products containing 9–10 mole % of 2,4,4'-trimethylpent-2-ene were obtained.

EXAMPLE 5

A polymer suspension as finally obtained in Example 4 was mixed with 1,000 parts of distilled water and the excess diisobutylene was driven off by introducing steam, at a bath temperature of about 110° C. When an internal temperature of 98° C. had been reached, the mixture was vigorously flushed with steam for a further ¼ hour. The kettle was then sealed pressure-tight, 895 parts of 25% strength aqueous ammonia were introduced over ½ hour, stirring was then continued for 1 hour at about 100° C., and thereafter the contents of the kettle were cooled. The resulting aqueous, almost clear colorless ammonium salt solution of the copolymer, of about 40% strength, was suitable for use as, for example, a paper size or a surface-coating for wood.

EXAMPLE 6

450 parts of dec-1-ene, 98 parts of maleic anhydride, 2,4 parts of a poly(octadecyl vinyl ether) having a K value of 40 and 1.2 parts of a poly(methyl vinyl ether) having a K value of 40 were introduced into a 1 liter flask equipped with a blade stirrer and the mixture was heated until it boiled gently (about 150° C.). An initiator solution of 1.2 parts of tert.-butyl hydroperoxide and 1.2 parts of tert.-butyl peroctoate in 25 parts of dec-1-ene was then run in uniformly over 3 hours and thereafter heating was continued for 2 hours. The slightly viscous suspension, containing spherical particles of sizes from 8 to 10 μm, was dried in a flat dish at 80° C. in a drying oven under reduced pressure. The K value of the copolymer was 19.5.

We claim:

1. In a process for the preparation of copolymers of maleic anhydride and $C_6$-$C_{10}$-alkenes by suspension copolymerization of the said monomers in the presence of a free radical initiator and a dispersant at an elevated temperature, in excess alkene as the suspension medium, the improvement that a poly(alkyl vinyl ether), where alkyl is of 1 to 20 carbon atoms, is employed as the dispersant.

2. A process as claimed in claim 1, wherein the dispersant is employed in an amount of from 0.01 to 5%, based on the weight of the monomers.

3. A process as claimed in claim 1 or 2, wherein the dispersant employed is a polymer of ethyl, tert.-butyl, n-butyl or octadecyl vinyl ether.

* * * * *